United States Patent Office 2,935,509
Patented May 3, 1960

2,935,509

PREPARATION OF STARCH DERIVATIVES CONTAINING NITROGEN

Eugene F. Paschall, Orland Park, Ill., assignor to Corn Products Company, a corporation of Delaware No Drawing. Application August 21, 1956
Serial No. 605,449

2 Claims. (Cl. 260—233.3)

This invention relates to the preparation of starch carbamates. More particularly it relates to the preparation of starch carbamates from starch and a urea in an aqueous system.

Various methods have been proposed in the past for employing urea in starch systems. It is well known in the prior art to add urea to aqueous starch suspensions as an auxiliary gelatinization agent. Also, it is known that urea may be incorporated into gelatinized starch to increase the plasticity of films prepared therefrom. Utilized in this fashion, urea is not chemically bound to starch.

U.S. Patent 2,131,724 discloses the preparation of cold water dispersible conversion products similar to British gums by heating dried starch with molten urea at temperatures ranging from the decomposition temperature of urea (about 130° C.) to about 200° C. The decomposition products in this art were believed to catalyze the dextrinization of the starch. Under the drastic conditions of the conversion, the starch was dextrinized to the extent that a cold water swelling conversion product was formed, making it impossible to purify the product by the normal washing procedures for starch, i.e., by washing with water. No claim was made that a derivative of starch was formed involving a primary valence. Indeed, at the elevated temperatures employed, urea would be expected to decompose rapidly into products which in themselves are not known derivatizing agents for starch.

U.S. Patents 2,538,903, 2,621,174 and 2,725,362 disclose the reaction of starch with a large variety of amidogen compounds (amides, amines or derivatives thereof) containing the $NH_2$ radical. In this prior art, reaction of starch with the amidogen compound is effected in a non-aqueous solvent system, the non-aqueous solvent having a boiling point at atmospheric pressure ranging from 80° C. to 115° C. The products obtained are cold water swelling, making it necessary to purify them by washing with an expensive organic solvent. The non-aqueous organic solvent employed both as a reaction medium and for purification of the product makes this process uneconomical.

The main object of this invention is to provide an economical and simplified process for the preparation of un-degraded (i.e., the viscosity of a gelatinized paste of the starch derivative is approximately the same as that of the parent starch), cold water insoluble nitrogen containing starch derivatives from the nitrogen containing reagents selected from the class

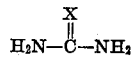

in which X represents oxygen or sulfur. Other objects will appear hereinafter.

I have discovered that starch carbamates may be prepared by heating a homogeneous mixture of starch, nitrogen containing reagent and a limited amount of moisture, i.e. 5 to 12 percent based on starch. The heating should be carried out at a temperature above about 90° C. but below the decomposition temperature of the reagent until the reaction is complete to form useful, undegraded, nitrogen containing starch derivatives. By maintaining the reaction temperature below the decomposition temperature of the reagent, dextrinization and solubilization of the starch by decomposition products is largely eliminated. Also a more efficient reaction between starch hydroxyls and reagents occurs since the latter are not destroyed by decomposition.

It is an unexpected result that starch and reagents of the previously described class could be heated in the presence of water at the temperature indicated above without gelatinizing starch, since these reagents are known to lower the starch gelatinization temperature. The presence of about one-half to one mole of water per mole of starch (about 5 to 12 percent) in the reaction mixture during the initial heating on the contrary serves the very important function of keeping the derivatizing agent dispersed (in solution) thus allowing for uniform derivatization. This is particularly desirable with reagents which are solids at the reaction temperature. For example, urea begins to decompose at its melting point, making it desirable for the reasons cited above to employ a reaction temperature below the melting point of urea, i.e. 90° C. to 120° C. A small amount of water keeps the urea in solution. During heating some moisture will be volatilized from the starch mixture into the reaction vessel, but the greatly increased solubility of the reagents in water at the elevated temperatures is believed to prevent crystallization of the urea. At 70° C., 26 g. of urea will dissolve in the amount of water contained in one mole of 5 percent moisture starch and even more will dissolve at higher temperatures.

At 120° C., 48.5 g. of thiourea will dissolve in the amount of water contained in 1 mole of 5 percent moisture starch.

Small amounts of salts, such as sodium and potassium acetate, function as catalyst for the reaction of starch with the above reagents. Used in amounts of 0.5 to 2 percent based on starch, the above salts increase the reaction efficiency as much as 10 to 20 percent. Other alkaline substances, such as sodium hydroxide and the like, and salts which hydrolyze to produce alkaline substances may also be used as catalysts.

The reaction mechanism involved with the various reagents is not known with certainty but may follow the course indicated by one or both of the equations shown below. That a starch derivative involving a primary valence is formed has been verified by elemental analysis after thorough washing of the products with both water and an organic solvent (by Soxhlet extraction with methanol).

(1) 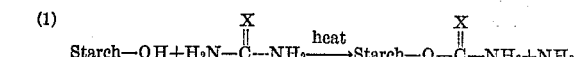

(2) 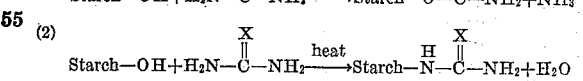

Uses for the products of this invention are numerous. The polar substituents,

confer many useful characteristics to starch. Products prepared by the process of this invention readily gelatinize when cooked in water to form pastes which possess increased stability and clarity compared to raw starch pastes. Also, the pastes exhibit unusual stability toward salts and pH variations, making the products useful in applications wherein a hydrophilic colloid or thickening agent which is stable in a salt, acid or basic medium is required. For example, the products are potentially useful as thickening agents for canned foods and puddings, as suspending agents for drilling muds and in textile printing pastes; in the latter instance stability at either an acid or alkaline pH is desirable so that either basic or acidic dyes may be used.

In addition to their use as stabilizing and thickening colloids, the starch derivatives of this invention show a greatly increased reactivity toward formaldehyde and formaldehyde resins, making the products potentially useful in waterproofing adhesives for textiles and paper when used in conjunction with formaldehyde or formaldehyde resins. Used in this manner, there is a greater degree of cross-linking of starch, increasing the water resistance of the cured adhesive. The increased reactivity of the derivatized starch results from the highly reactive nature of the

substituent toward the above reagents.

The invention is applicable to all raw starches, e.g. corn, grain sorghum, tapioca, and the like, and to various so-called modified starches, e.g. thin boiling starches and the like.

The following examples which are intended to be informative and illustrative only and not in a limiting sense will further illustrate the invention.

EXAMPLE 1

*Preparation of thick-boiling starch carbamate*

One mole of raw corn starch (180 g. at 10 percent moisture) was slurried in 200 ml. of water containing 0.83 mole (50 g.) of urea. The slurry was filtered and the filter cake air-dried to 12 percent moisture. Approximately 0.4 mole of urea was retained by the filter cake. The semidry filter cake was roasted for 7.5 hours at 105° C. in a vacuum oven. After cooling, the product was slurried in 250 ml. of water, filtered and the filter cake washed with one liter of distilled water. The air-dried product analyzed 0.69 percent nitrogen by the Kjeldahl method, equivalent to a 0.091 degree of substitution product assuming that starch carbamate was formed as shown by Equation 1.

A portion of the product was Soxhlet extracted for 24 hours with 95 percent ethyl alcohol. The product then analyzed 0.67 percent nitrogen equivalent to a 0.08 D.S. product. A 15 g. (12 percent moisture) Scott viscosity of 180 seconds per 50 ml. of paste was found compared to a 70 seconds value for the parent starch. The paste was relatively clear and did not setback or gel on two week's standing.

EXAMPLE 2

*Preparation of thick-boiling starch carbamate using potassium acetate as catalyst*

Two moles of raw corn starch was slurried with a solution containing 50 g. urea, and 10 g. potassium acetate in 350 ml. of water. The slurry was filtered and the filter cake air-dried for three days to 10 percent moisture. The semidry mixture was pulverized in a Waring Blendor and then heated in a closed oven for 4.5 hours at 100° C. to 105° C. at atmospheric pressure. After cooling, the product was reslurried in water, filtered, and the filter cake thoroughly washed with distilled water. The air-dried product analyzed 0.602 percent nitrogen, equivalent to a degree of substitution of 0.081. This is equivalent to a 40 percent reaction, based on urea retained by the starch filter cake. A reaction performed under similar conditions but without potassium acetate resulted in a 0.062 D.S. product equivalent to a reaction efficiency of 31 percent.

EXAMPLE 3

*Preparation of thin-boiling starch carbamate using potassium acetate as catalyst*

One mole of acid hydrolyzed corn starch, 60 fluidity, was slurried into a solution consisting of 175 ml. of water, 0.4 mole (25 g.) of urea and 5 g. of potassium acetate. The slurry was filtered and the filter cake air-dried to 8 percent moisture. The semidry mixture was heated in a vacuum oven 4 hours at 100° C. to 105° C. After cooling, the product was slurried in water, filtered and the filter cake thoroughly washed with water.

A 28.35 g. (12 percent moisture) Scott value of 39 seconds per 100 ml. of paste was found which is equivalent to a 51 fluidity product. The paste was comparatively clear and did not setback nor gel upon standing two weeks. The degree of substitution of the product was 0.056.

EXAMPLE 4

*Reaction of raw corn starch with thiourea*

One mole of raw corn starch (180 g. at 12 percent moisture) was slurried into 170 ml. of a solution containing 0.33 mole of thiourea (25 g.) and 10 g. of potassium acetate. The slurry was stirred one hour, filtered, and the filter cake air-dried to about 12 percent moisture. After pulverizing in a Waring Blendor, the mixture was heated in a vacuum oven 4 hours at 110° C. The product was cooled, slurried in water, filtered and the filter cake washed thoroughly with water. The product analyzed 0.12 percent nitrogen. A cooked paste of the product remained stable after standing two weeks.

I claim:

1. A process for preparing starch carbamates which consists in slurrying starch and a nitrogen compound in water, dewatering the slurry to produce a starch mixture and drying the starch mixture to from about 5 to about 12 percent moisture content without gelatinizing the starch and thereafter heating said dried mixture at a temperature within the range of about 90° to 110° C.; said nitrogen compound having the formula

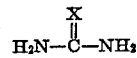

wherein X represents an element from the group consisting of oxygen and sulfur.

2. Process according to claim 1 wherein a soluble acetate salt is used as a catalyst.

References Cited in the file of this patent

UNITED STATES PATENTS

| | | |
|---|---|---|
| 2,134,825 | Hill et al. | Nov. 1, 1938 |
| 2,461,139 | Caldwell | Feb. 8, 1949 |
| 2,562,978 | Wolff | Aug. 7, 1951 |
| 2,621,174 | Gaver et al. | Dec. 9, 1952 |